Aug. 21, 1951     J. DE STERNBERG     2,564,885
INJECTION MECHANISM FOR PRESSURE DIE-CASTING MACHINES
Filed July 19, 1949     10 Sheets-Sheet 2

INVENTOR
JAIME DE STERNBERG
By:
Haseltine, Lake & Co.
AGENTS

Aug. 21, 1951 J. DE STERNBERG 2,564,885
INJECTION MECHANISM FOR PRESSURE DIE-CASTING MACHINES
Filed July 19, 1949 10 Sheets-Sheet 5

INVENTOR
JAIME DE STERNBERG
By: Hazeltine, Lake & Co.
AGENTS

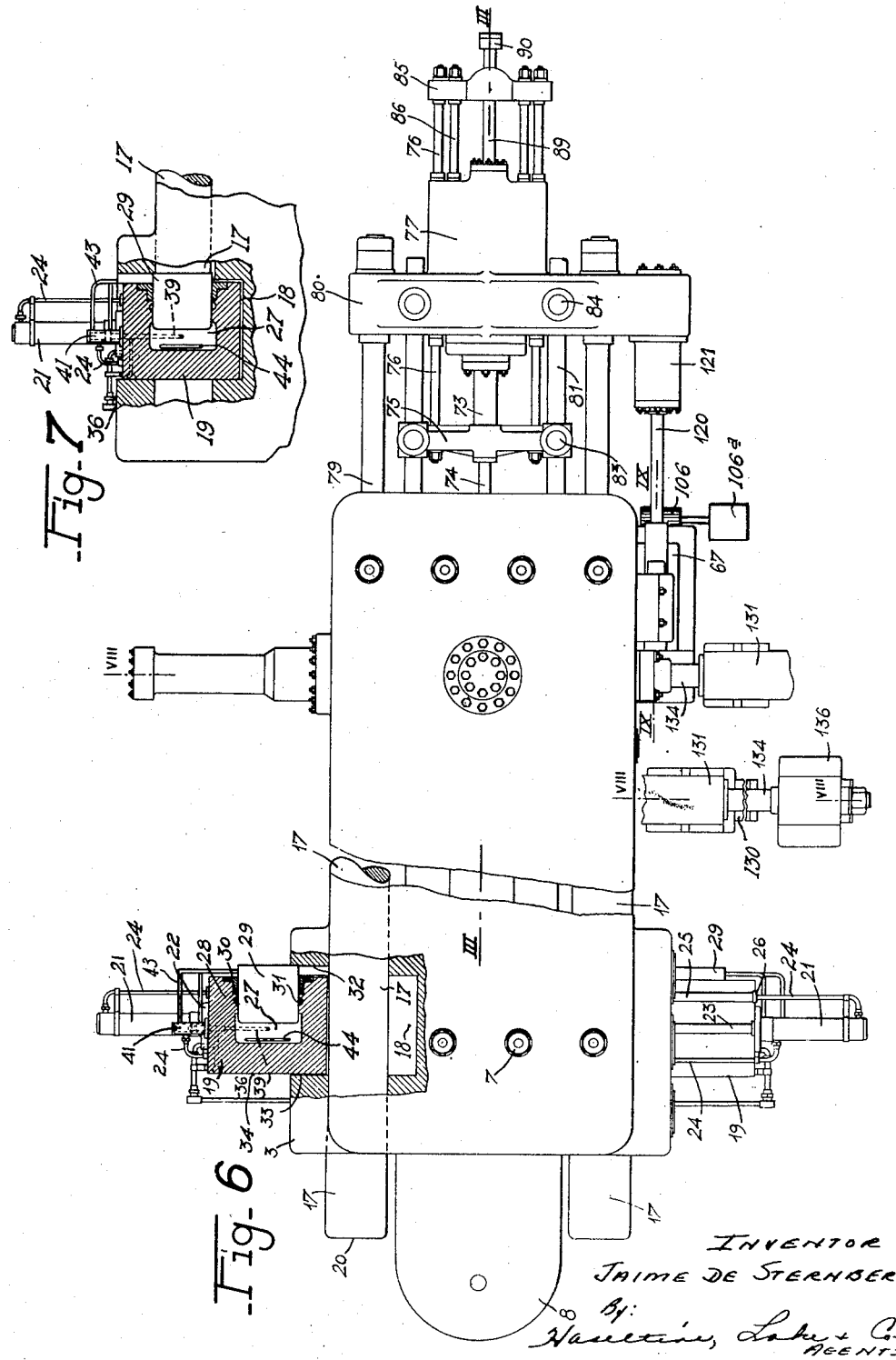

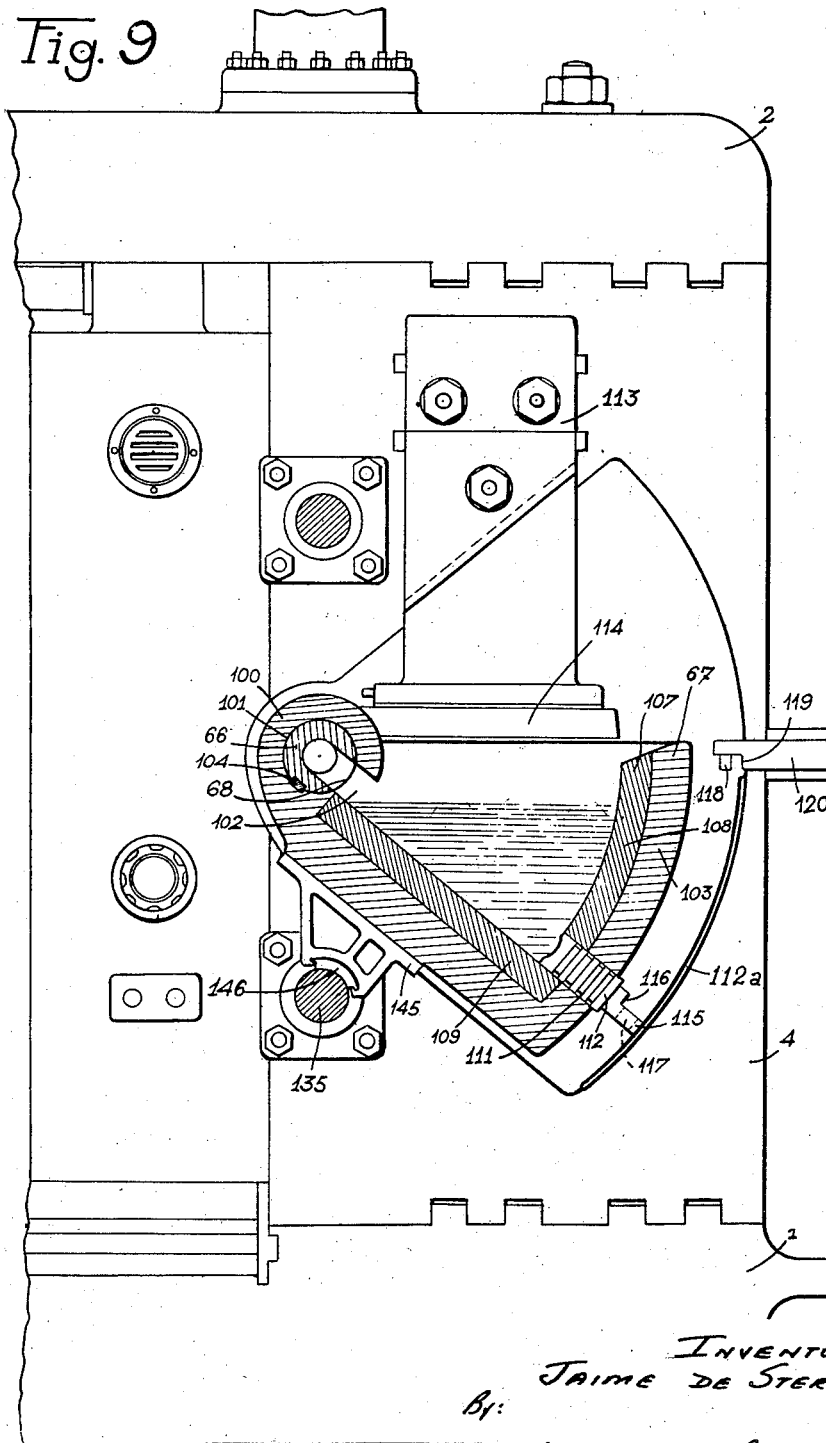

Aug. 21, 1951  J. DE STERNBERG  2,564,885
INJECTION MECHANISM FOR PRESSURE DIE-CASTING MACHINES
Filed July 19, 1949  10 Sheets-Sheet 9
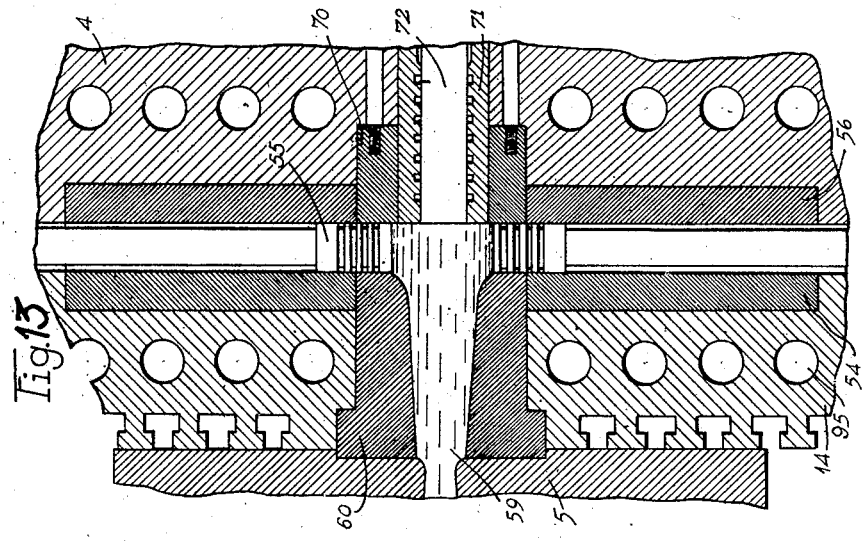
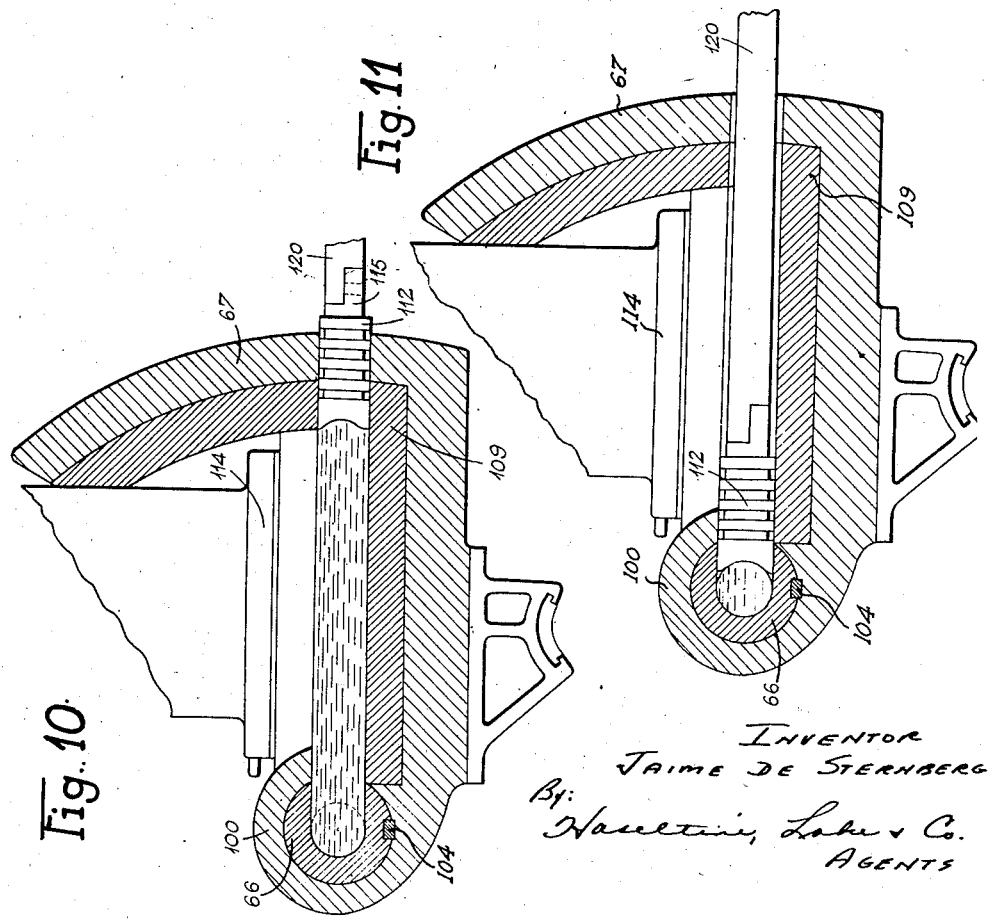
INVENTOR
JAIME DE STERNBERG
By:
Haseltine, Lake & Co.
AGENTS Aug. 21, 1951  J. DE STERNBERG  2,564,885
INJECTION MECHANISM FOR PRESSURE DIE-CASTING MACHINES
Filed July 19, 1949  10 Sheets—Sheet 10
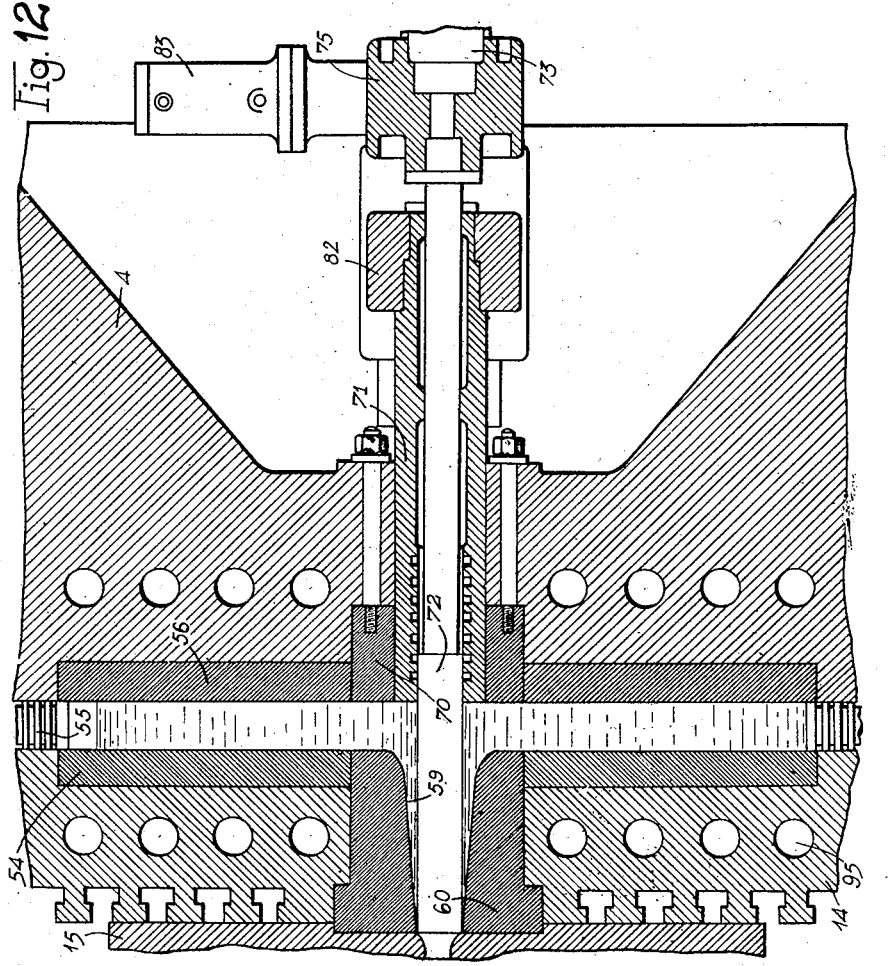
Inventor
Jaime de Sternberg
By:
Haseltine, Lake & Co.
Agents

Patented Aug. 21, 1951

2,564,885

UNITED STATES PATENT OFFICE 2,564,885

INJECTION MECHANISM FOR PRESSURE DIE-CASTING MACHINES

Jaime de Sternberg, Courbevoie, France

Application July 19, 1949, Serial No. 105,628
In France June 28, 1949

4 Claims. (Cl. 22—68)

Machines are already known for the diecasting of metals and more particularly of steel. These machines involve, for the operation of their elements, considerable powers, since the quality of the products obtained depends essentially on the pressure under which they were cast. During casting, in the last stage of this operation, it is necessary to apply to the metal when still soft, a very high dieing pressure which, properly speaking, constitutes an actual forging operation.

Such machines, with a hydraulic drive, have been built and they operate perfectly when the amounts of steel to be handled in one operation do not exceed a few pounds.

The present invention relates to pressure diecasting machines capable of casting, in one operation, steel parts, for instance, weighing several hundred pounds.

The amounts of metal necessary for filling the empty spaces in the mould are too considerable to contemplate effecting the injection into the mould by means of only one injection cylinder. There would inevitably occur seizures and foulings causing a complete stoppage of the machine. To obviate these drawbacks, the main object of the present invention is to provide a pressure diecasting machine wherein the injection elements consist in a multiplicity of opening cylinders. The diameters and strokes of the injection pistons are thus reduced to such dimensions that no seizing need be feared.

The whole of the injection cylinders is preferably constituted of a plurality of cylinders with concurrent axes and contained in one plane. The opening of the injection mechanism is effected along a diametral plane common to all cylinders.

According to an important feature of the present invention, the mould proper is divided into two sections, each one of them being carried by a movable frame. One of said sections is mounted on a movable frame associated with ram plungers and with the rod of an operating piston. The second movable frame, carrying the second mould section, is connected with the first frame by traction rods slidably mounted in said first frame and formed with stops which, at the opening of the mould, bear on the front face of said first frame in such a manner that said first frame moves first, effecting the opening of the mould proper and then causes the motion of the second frame. The rear face of the second frame is formed with the stamps which constitute all the movable injection half-cylinders while the complementary half-cylinders are carried by the fixed portions of the machine. Under such conditions, the piston for opening the moulds will first cause the opening of the moulds, and then the opening of the injection mechanism, for cleaning and checking purposes. The presence of a half-mould and of a half-assembly of injection cylinder portions on the same moving part makes it possible to reduce to two the number of said moving parts.

The various elements of the machine are preferably driven, as defined above, hydraulically through sets of double action pistons and cylinders. It is obvious, however, that such hydraulic means could be replaced by mechanical, electrical or other means.

The thus built machine makes it possible to handle quantities of steel amounting to several hundred pounds at a production rate of approximately one closing of the moulds every two minutes. The various operations can, of course, be effected by manual control but they could be adjusted by an automatic control capable of causing the various operating elements to effect the functions necessary for the performance of the operating cycle in a strictly sequentially timed order.

According to the present invention, the injection mechanism may be associated in the same pressure diecasting machine with a mould section locking device such as the one described in my co-pending application Serial No. 105,626 filed July 19, 1949, and/or with a supplying device in molten metal such as the one described in my co-pending application Serial No. 105,627 filed July 19, 1949.

The following description, taken in connection with the appended drawings given by way of example will show clearly how the invention may be put in application.

Figures 1 and 2, placed together, show a profile view of a diecasting machine according to the invention, with part of said machine torn off at the level of the lock.

Figure 3:
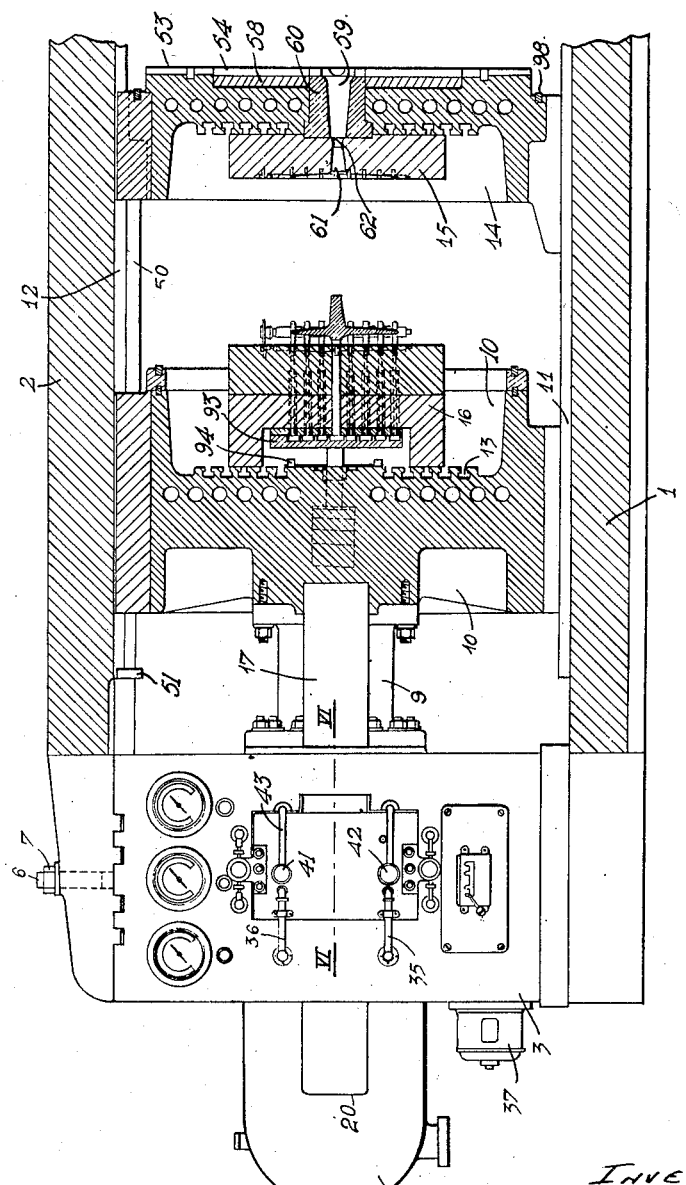
Figure 3 shows, partly in section, taken along line III—III of Fig. 6, the machine on the side of the piston operating the opening of the mould, said mould being open.
Figure 4:
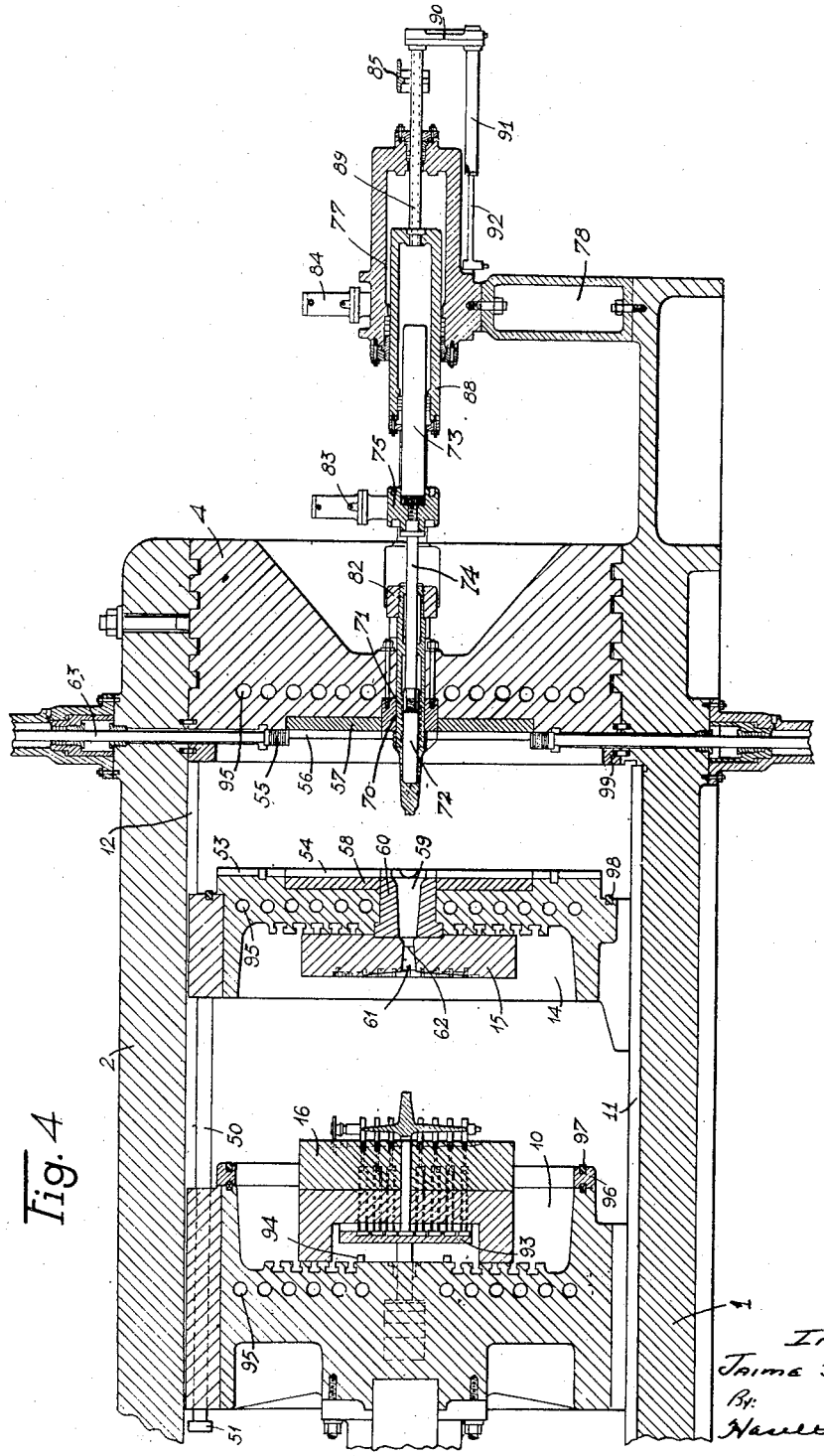

Figure 4, complementary to Figure 3 shows a section of the machine on the side of the injection cylinders.

Figure 5:
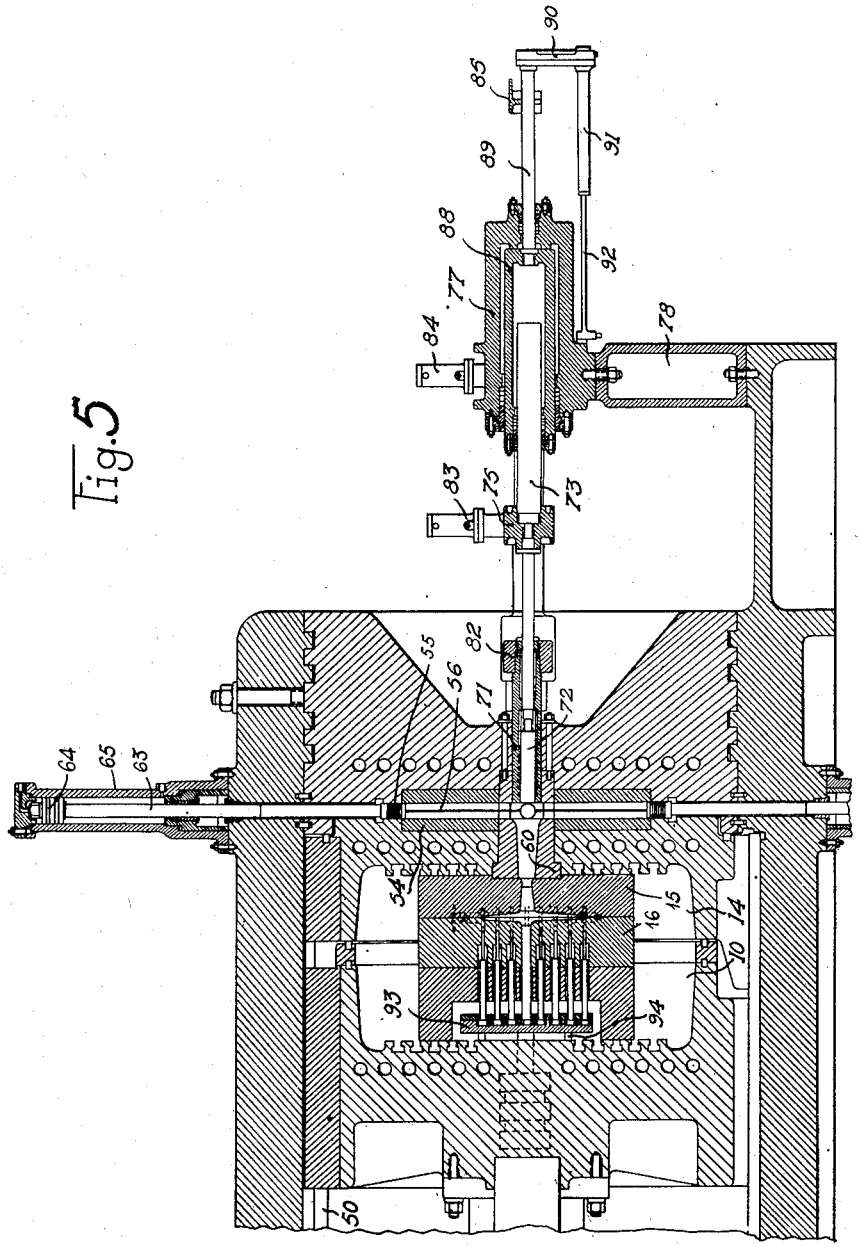

Fig. 5, similar to Fig. 4, shows a section of the machine, the various portions of the mould being adjacent.

Fig. 6 is a plan view of the machine with a partial cross-section through the line VI—VI of Fig. 3 which shows one of the locks in inoperative position.

Fig. 7 is a partial view corresponding to Fig. 6, the lock being in operative position.

Figure 8:
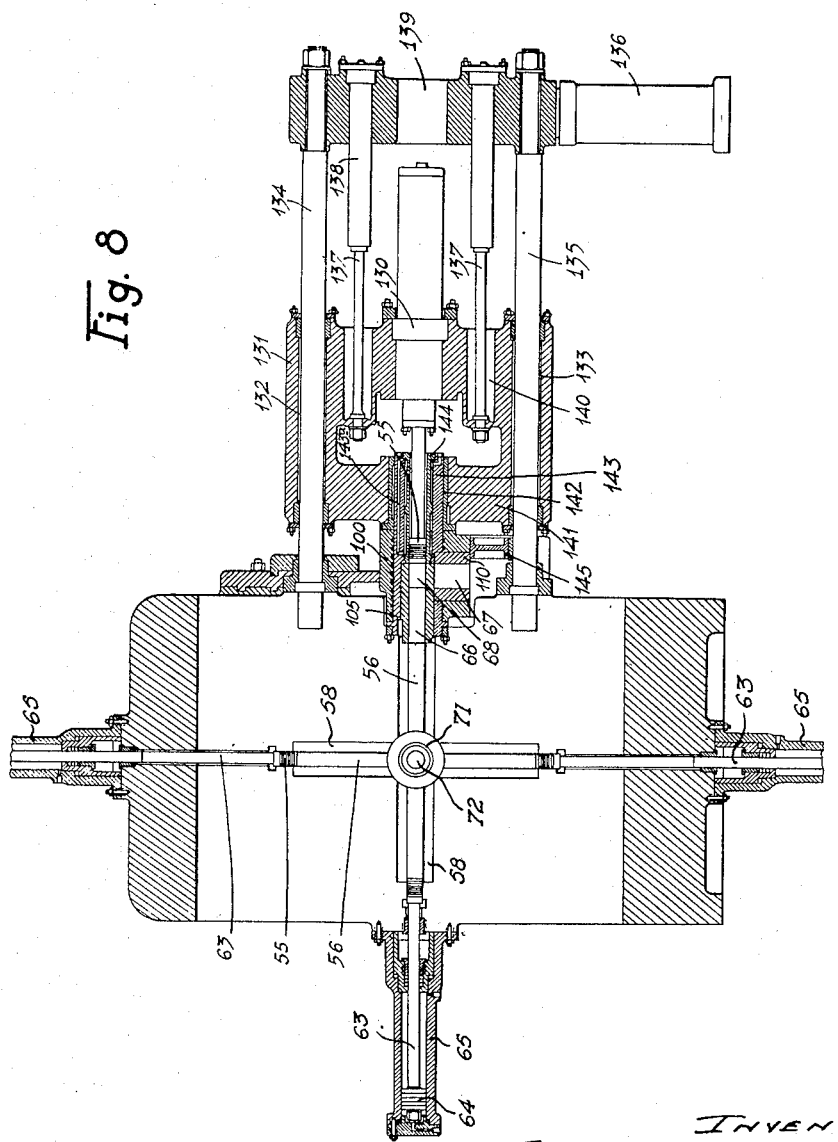

Figure 8 shows a partial section of the machine along line VIII—VIII of Figure 6.

Figure 9 shows, on a larger scale, a profile view of the machine with a section effected along line IX—IX of Figure 6.

Figure 10 shows in partial section the ladle shown on Figure 9 in the raising position.

Figure 11 is a view similar to Figure 10, showing the positions of the elements at the end of the filling period.

Figure 12 shows, on a larger scale, the positions of the elements in the injection chambers at the end of the injection cylinder filling period.

Figure 13 shows, similarly to Figure 12 the positions of the elements at the end of the mould filling.

The machine comprises (Figures 1 to 4) a frame formed by a lower slide 1 and an upper slide 2, slides which are anchored on end crosspieces 3, 4 by castellated assemblies 5 tightened by threaded rods 6 which receive tightening nuts 7. The crosspiece 3 supports a hydraulic cylinder 8 associated with a control piston 9 secured to a frame 10, moving on sliding surfaces 11 and 12 formed on slides 1 and 2. Frame 10 carries protruding parts 13 for the fixation of the drag 16. This frame is to be brought in the neighbourhood of a frame 14, supporting the cope 15 complementary to drag 16 carried by the frame 13. Said drag and cope are brought together under the action of the hydraulic piston 9. This piston is double acting and ensures the uniting of the cope 15 and the drag 16 along their jointing plane, as well as their separation.

In addition to the piston rod 9, the frame 10 carries two ram plungers 17 which traverse the end crosspiece 3 through bores provided for that purpose.

On the two opposite sides of the crosspiece 3 housings 18 are provided, for receiving sliding locks 19 (Figs. 6 and 7) which become interposed behind the ends 20 of the ram plungers 17 when the component elements of the complete mould are united, i. e. when the frame 10 is pushed all the way against the frame 14.

Figure 1:
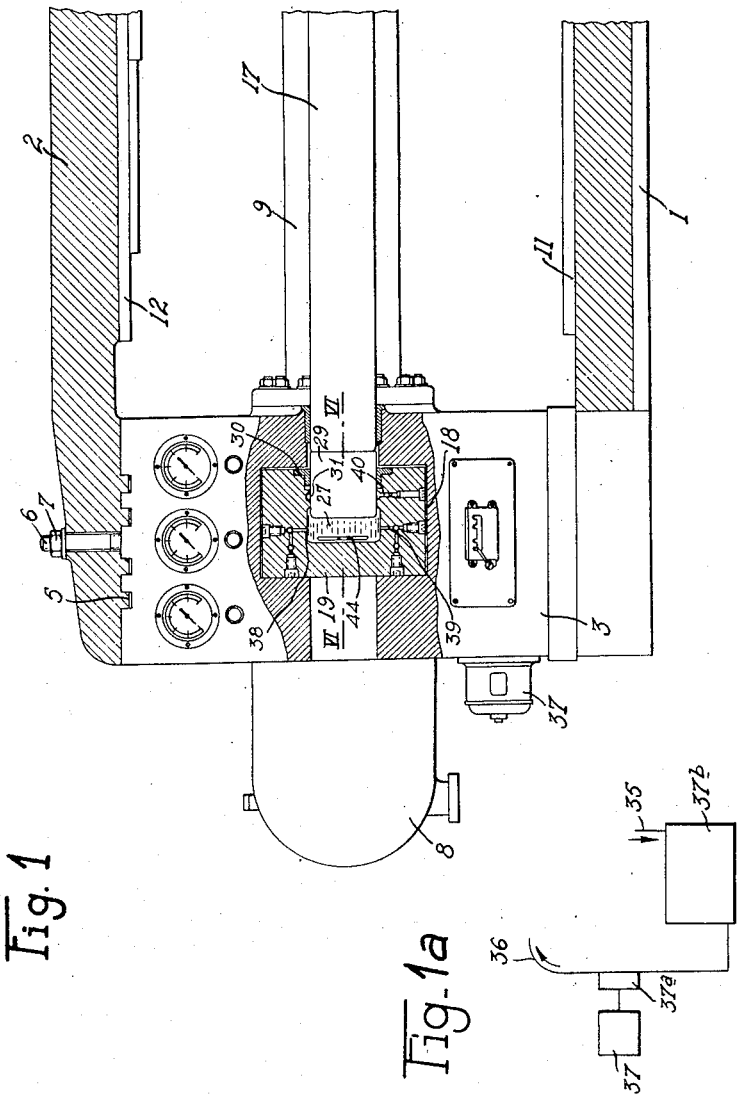
Figure 1a shows, schematically the supply circuit for the fluid locks.
Figure 2:
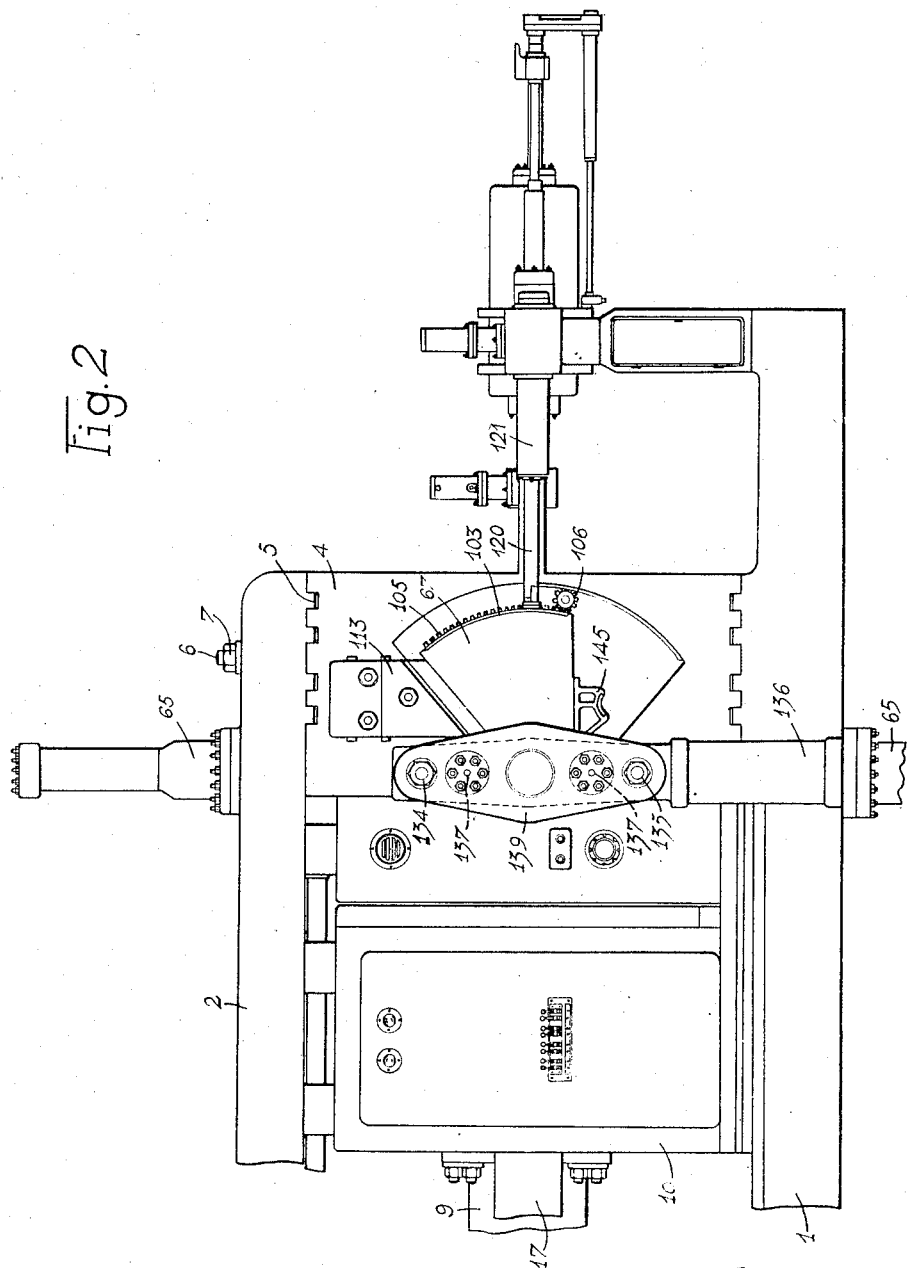

The locks 19 are driven by double acting hydraulic cylinders 21, which are associated through plates 22 with the bodies of the locks. Each lock 19 is operated by an assembly of two cylinders 21 respectively arranged above and underneath the lock and each cylinder contains a piston the rod 23 of which is secured at one of its ends to the side face of crosspiece 3. The driving fluid is brought into the cylinders 21 by rigid pipes 24 reaching each end of the cylinder and capable of sliding in a telescopic manner inside the distributing pipes 25 (Figure 6) with interposition of tightness seals such as 26. Under such conditions, the piston is fixed and the cylinder 21 moves with respect to the piston, driving the lock 19. The lock 19 is a hollow body capable of withstanding very high pressures and the chamber 27 provided therein opens on the side through a cylinder 28 which contains a piston element 29. The piston element 29 is guided inside the cylinder 28 and the tightness is ensured by a packing 30 acting as a gland, completed by a retaining groove 31 (Figs. 1 and 6).

The displacement axis of each piston 29 is parallel with the displacement axis of the ram plungers 17 and the housing 18 of the lock comprises a relief 32 for the passage of the foot of the piston 29. This housing 18 comprises, further, a bearing face 33 for receiving the corresponding bearing face 34 of the lock, this bearing face 33 also containing the opening in which the ram plunger 17 moves.

The chamber 27 of the lock is placed in communication through telescopic pipings 35 and 36 with a mercury tank 37b located inside the crosspiece 3. This mercury tank is provided with a refrigerating device. A pump 37a, driven by a motor 37 is capable of drawing the mercury from the above tank to bring it, under a high pressure, into chamber 27 through the piping 36. This piping 36 opens into ducts formed in the mass of the lock 19 and opening through a perforation 38 into the chamber 27 at the upper portion of the latter. Similarly, at the lower portion of the chamber 27 open ducts 39 formed in the mass of the lock 19, and placed into communication with the telescopic pipe 35 to ensure, through gravity, the return of the mercury contained in the chamber 27 to the refrigerated tank. The retaining groove 31 communicates through a duct 40 with the return duct 35.

In the inlet and return ducts for mercury, machined in the mass of the lock 19, there are interposed stop valves operated by hydraulic cylinders 41 and 42. These double action cylinders 41 and 42 play the part of closure cylinders for the mercury valves and said cylinders are connected with the hydraulic circuit of cylinders 21 through telescopic pipes 43, the ends of which only have been shown and which are similar to the pipes 24. These hydraulic connections are effected in such a manner that when the cylinders 21 are operated to drive the locks 19 into the receiving cavities, the valves 42 are closed and the valves 41 are open; at the end of the driving in of the locks 19, the valves 41 also close, thus enclosing in hermetically sealed spaces the mercury contained inside chambers 27. When the cylinders 21 cause the locks 19 to come out of their housings the valves 41 and the valves 42 open, allowing the return of the mercury contained in the cavities 27 to the refrigerating tank, the mercury pump 37a being stopped.

Further, inside the space 27 an incased heating element 44 is arranged, strongly armoured so as to be able to withstand very high pressures. This electric heating element, the external connections of which have not been shown, acts to heat the mercury contained in the chamber 27 when said chamber is hermetically sealed by the valves 41 and 42. Under these conditions, the mercury tends to expand with a considerable expansion power. Now when this expansion tends to occur, the lock 19 is completely pushed inside the cavity 18 and the piston element 29 is applied against the rear edge 20 of the corresponding ram plunger 17, said ram plunger 17 having been carried completely forward by the hydraulic piston 9. The expansion of the mercury thus brings into action considerable pressures which are transmitted along the jointing plane of the scope 15 and the drag 16, ensuring the closing of the mould with a very high energy.

The operation of the above described device, consequently is as follows:

The piston 9 ensures the closure of the mould and when the two half sections are in contact along their jointing plane, the locks 19, operated by the hydraulic cylinders 21, enter the housings 18 and insert themselves behind the ram plungers 17. The cavities 27 are filled with mercury by the mercury pump driven by the motor 37, said mercury being relatively cold. The pistons 29 are applied against the ram plungers 17 and at that time the spaces 27 are hermetically sealed. The heating element is put in action during the whole time of the mould closure.

When the mould is to be opened, the action of the heating element 44 is discontinued or not. The valve 42 is opened thus allowing return of hot mercury to refrigerated tank. The pistons 29 move back. The cylinders 21, driven in the opposite direction, cause the locks 19 to come out and free the passage for the ram plungers 17. The mould is opened by the slip caused by the piston 9. The mercury is refrigerated inside its tank and is prepared for the next locking operation.

The volume of chambers 27 and the thermal energy developed by the heating elements 44 are determined so as to obtain the required pressure on the jointing plane of the half-moulds. The hydraulic energy to be brought into action is thus reduced to that which is necessary for obtaining the operations and the hydraulic pressures can thus be reduced in a very large proportion, which brings about a substantial saving in motive force. Further, the forces necessary for the putting under pressure of the jointing plane of the sections of the mould are also obtained very economically, since there is no need to provide any pressure accumulator or any pump developing said pressure. The total cost of the installation will be favorably affected since the dimensions of the pressure producing mechanisms will be very much reduced.

The above described mechanisms are for the purposes of opening and closing the moulds, wherein a molten metal is injected under pressure, this metal being generally steel. The device allows the construction of moulds having very large dimensions, wherein considerable pressures will be developed at the time of dieing. These large dimensions of the moulds thus make it possible to mould bulky parts, such as for example parts weighing about 900 to 1350 pounds. The filling of the mould, under such conditions with such a large amount of steel, makes it impossible to use a single filling cylinder. Such a cylinder would have such diameter and length that seizing of the thrust piston would inevitably occur.

To obviate such drawbacks, the machine comprises a plurality of cylinders for filling the mould, wherein pistons move, said cylinders being capable of being opened after each injection operation.

Under such conditions, as clearly shown in Figure 4, the frame 14 carrying the cope 15 is also mounted so as to be movable along the slides 11 and 12 and it is tied to the frame 10 by assemblies of sliding rods 50 attached to frame 14 and going through the frame 10 in corresponding bores where the rods 50 can move freely. Stops 51 are provided on the rods 50 in such a manner that the backward motion of the frame 10 causes first the separating of the half sections 15 and 16 before causing the backward motion of the frame 14.

Opposite the face carrying the cope 15, the frame 14 is formed with a face 53 on which are mounted half-cylinders 54 for injection pistons 55. The conjugate half-cylinders 56 are formed in fittings 57, secured to the crosspiece 4. Similarly the half-cylinders 54 are formed in fittings 58 secured to the frame 14.

The pistons 55, four in number in the machine more precisely described, are opposite in pairs and at right angles to each other. Their axes are contained in a plane perpendicular to the movement axis of the frames 10 and 14. The axes of said cylinders 54, 56 are concurrent and, perpendicularly directed to their plane a converging tuyère 59 for the injection of metal opens into the frame 14, said tuyère being formed in a socket 60 secured to the frame 14. This injection tuyère opens into a pouring hole 61 formed in cope 15 and which follows it, said pouring hole being used for the formation of the runner-stick of the metal introduced into the stamps of the mould and having a neck 62 which constitutes, in said runner-stick, the breaking throttle upon opening the mould.

The pistons 55 (Figure 5) are set in motion by rods 63 which are connected with pistons 64 moving inside double action hydraulic cylinders 65. Said cylinders 65 make it possible to obtain synchronous reciprocating motions of pistons 55, for example.

The introduction of the molten metal in the injection half-cylinders 54, 56 is effected through one of the cylinders 66 of this series of cylinders. To this effect the half-cylinders 66 comprises a lateral aperture which communicates with a ladle 67. This aperture 68 is effected in the half-cylinder 66 in front of the corresponding piston 55 when the latter is at the end of its back stroke.

The injection mechanism described below is completed by a mechanism for closing the tuyère 59 and for dieing the metal introduced into the stamps and which shall now be described:

The crosspiece 4 comprises, at its center, a cylindrical bore 70 formed in a socket and wherein moves a sleeve 71. The sleeve 71 itself is provided with a bore wherein a cylindrical mandrel 72 can move. The sleeve 71 has such a diameter that it can be applied in the tuyère 59 to obturate it in the vicinity of its wider portion and in a zone facing the crosspiece 4 while the diameter of the mandrel 72 is such that it slides inside the tuyère 59 in its narrower portion and obturates the aperture thereof facing that of the pouring hole 61. The tuyère 59 can thus be closed in two different manners, either by the sleeve 71 or by the mandrel 72. The mechanism operating the sleeve and mandrel comprises a hydraulic piston 73 tied to the mandrel through a rod 74, the piston and said rod being associated with a yoke 75; said yoke 75 is connected to return rods 76. The piston 73 is operated by a hydraulic cylinder 77 carried by a pillar 78, said cylinder being further tied to the crosspiece 4 through rods 79. Said rods 79 are also tied to a yoke 80 associated with the cylinder 77. The yoke 75 is capable of sliding on rods 81 which, through corresponding bores, go through the yoke 80 and which are associated with a movable yoke 82, itself associated with the sleeve 71.

In line with the rods 81, on the yoke 75 and on the yoke 80, stopping locks are provided, acting by the entrances of latches in apertures provided in said rods 81, these wedging latches being operated by auxiliary hydraulic cylinders 83 and 84 and not being shown for greater clearness in the drawings.

The rods 76 go through the frame of the cylinder 77 and are tied to a movable yoke 85 acted upon by the rods 86 of auxiliary hydraulic return pistons contained in the frame of the cylinder 77.

The cylinder 77 comprises an inner piston 73, tied to the yoke 75 and which enters a second piston 88 moving inside the cylinder 77. This hollow piston 88 is supplied by a pipe 89 going through the yoke of the cylinder 77 in a tight sliding manner, and is tied to the yoke 85. By an angle piece 90, the pipe 89 is put in communication with a cylinder 91 sliding in a tight and telescopic manner on a supply pipe 92.

The operation cycle of the apparatus thus described is as follows:

As will be seen clearly on Figure 5, the empty mould is closed. The cylinders 54, 56 are empty. The sleeve 71 and the mandrel 72 are at their rear positions. By means of the ladle 67 which will be described later, the cylinder 66 is filled with molten metal and the latter enters the cylinders 54, 56. Previous to the filling, (Figure 12), the mandrel 72 is pushed forward completely until it closes the tuyère 59. The molten metal fills only said cylinders 54, 56. The mandrel 72 has been pushed all the way by means of the pistons 73, 88, the locks 83 having released the yoke 75 from the rods 81 and the locks 84 having been put in action for wedging said rods 81 and keeping the yoke 82 in its rear position. The sleeve 71 has been left behind.

The locks 83 and 84 remaining in the position indicated above, the return pistons acting on the rods 86 are put in action said rods 86 in turn acting on movable yoke 85, rods 76, yoke 75, rod 74 and mandrel 72. The mandrel 72 moves back completely (Figure 13) and the cylinders 65 are placed under load. The pistons 55 move closer to the point of convergence of their axes and the metal is driven into the stamps of the mould through the injection tuyère 59 and the pouring hole 61. At that time, the locks 84 are released and the locks 83 are wedged. The piston 88, acting as a cylinder is put under load by the pipes 89, 90, 91, 92, and the assembly of the mandrel 72 and of the sleeve 71 passes between the pistons 55 which are closer together and drives the liquid metal which was in this space, into the tuyère 59. When the sleeve 71 comes in contact with the wall of the tuyère 59, said tuyère is closed. At that time (Figure 5), the locks 84 are wedged and the locks 83 are released. The pipe 92 is then stopped and only the piston 77 is supplied, causing an important thrust on the mandrel 72, the only one which is free. The mandrel 72 enters the tuyère 59 (Fig. 12) and causes the dieing of the metal contained in the stamps of the closed mould. Under such conditions, the metal undergoes an actual forging operation which gives it a great strength.

When the metal is sufficiently cooled inside the closed mould, the hydraulic supplies of the injection mechanism are cut off and the pistons 64 are simultaneously moved upwards towards the dead points remotest from the axis of their assembly. The piston 9 is put in action for opening, so that cope 15 and drag 16 separate. The moulded parts are retained on the drag 16. When the stops 51 of the rods 50 (Figure 4) come in contact with the frame 10, the frame 14 is driven with the frame 10, causing the opening of the injection cylinders. The mass of metal contained in the pouring hole 61 breaks at the level of the neck 62 and there remains a runner stick associated with the moulded parts, on one hand, and a gate pit surrounding the mandrel 72, on the other hand. The backward motion of the mandrel 72 and of the sleeve 71 will cause said gate pit to fall. Ejectors 93 bear on stop rods 94, go through the frame 10 and, pushing against the crosspiece 3, will cause the extraction of the moulded parts out of the drag 16 and the moulded part will be capable of being seized by a suitable conveyor. The complete opening of the moulds and injection mechanisms will allow a complete cleaning of said mechanisms and their covering, for example by spraying of a suitable liquid.

It is to be noticed that the frames 10 and 14 and the crosspiece 4 comprise refrigeration ducts 95 for keeping them at a sufficiently low temperature whatever be the rhythm adopted for the casting operations. It is also to be noticed that the frames 10 and 14 are made in the shape of cups containing the mould sections 15 and 16. The cup of the frame 10 is edged by a packing 96 which offers a plastic ring 97 for bearing on the edges of the cup formed in the frame 14 so that the moving closer together of these two frames creates a sealed enclosure around the closed mould sections. The moulding can thus take place in a controlled atmosphere. Similarly, the rear face 53 of the frame 14 comprises a sealing ring 98 which, applied on a ring 99 of the front face of the crosspiece 4 will make it possible to insulate the injection mechanisms and to also operate said injection in a controlled atmosphere.

When the mould sections and injection mechanism are suitably cleaned, the piston 9 causes the joinings and closures and the operation cycle can be repeated.

To operate at a fast rhythm, the moulding machine must be supplied with molten metal by means of a ladle 67 which makes it possible to accurately determinate the amounts of metal for the injection, and said ladle must be capable of being easily cleaned and replaced. To this effect the ladle 67 is mounted on one of the sides of the crosspiece 4 and, in profile, it assumes the shape of a circular sector (Figures 9 to 11). The metal wall of said ladle constitutes a pivot 100 whose bearing surface 101 encloses the cylinder 66. Said pivot 100 is pivotally mounted in a bearing member 100a. The aperture 68 provided radially inside the cylinder 66, inside the pivot 100 opens through an aperture 102 in said ladle. This ladle is keyed by a cotter-pin 104 on the cylinder 66 which pivots inside a socket and is connected tightly at the end of the corresponding cylinder 56. The circular wall 103 of the ladle is formed with a gear 105 coming into engagement with a pinion 106 the shaft of which is driven by a raising motor 106a (Fig. 6). This raising makes it possible to cause the metal introduced into the ladle at the level of the receiving spout 107 to flow through the aperture 102 and the aperture 68 into the cylinder 66. The walls of the ladle are provided with a refractory lining 108, said wall offering a cylindrical portion, a plane bottom 109 and sides in the shapes of circular sectors 110 (Figure 8).

The cylindrical wall of the ladle is formed with an aperture 111 wherein a draining piston 112 is introduced. The cylinder 111 is tangent to the plane bottom 109 and the aperture 102 as well as the aperture 68 are located on the geometrical extension of the cylinder 111. Above the ladle 67 there is attached, on the crosspiece 4, a support 113 associated with a plate 114 forming a driving out piston. To this effect the contour of this driving out piston 114 is such that it enters exactly the space between the walls of the ladle during the raising of the latter. This piston 114 bears against the pivot 100. The piston 112 is provided with a tail piece 115 which comprises a half thickness assembling element 116 and a perforation 117. This half thickness assembling and this perforation are for the purpose of coming into engagement with a stud 118 and a corresponding assembly 119 provided on a thrust rod 120 (Figure 9) having an invariable direction with respect to the machine.

Upon the raising of the ladle, once it has been filled with metal brought by the spout 107, through the space which separates this spout from the contour of the piston 114, said piston 114 enters the ladle and drives out the metal contained therein into the cylinder 66. This operating phase is shown in Figure 10. At this moment, the tail piece 115 of the piston 112 guided by the wall 112a is associated with the rod 120 and the metal included between the bottom 109 and the piston 114 is ready for being completely driven out of the ladle by the thrust of the rod 120. The piston 112, the head of which is slightly hollowed is driven until it comes in line with the transverse bore of the cylinder 66. At this time the corresponding piston 55 (Figure 8) will drive out the metal remaining inside the pivot.

The operating of the rod 120 is caused by a hydraulic piston moving inside a double action cylinder 121 provided on the side of the crosspiece 80.

Construction and operation of this type make it possible to obtain an easy filling of the ladle and a total ejection of the metal it contains. The return of the piston 112 and the lowering in rotation of the empty ladle is effected by operations in the reverse direction to those described and when it reaches its lower position, the ladle is again ready to be filled. Suitable stops are provided for preventing the piston 112 from escaping from the bore 111.

The ladle 67 which receives the extremely hot metal is subjected to a rapid wear. Further, to effect the cleaning of said ladle, which must be fairly frequent, the latter must be easily accessible from the outside.

As can be seen from Figures 6 and 8, the corresponding piston 55 is driven by a hydraulic, double action cylinder 130, carried by a yoke 131; this yoke 131 comprises two bores 132, 133 which allow its motion on cylindrical guides 134, 135, one end of which is attached on the crosspiece 4 and the other end of which is carried by a stand 136 arranged laterally with respect to the machine. The front portion of the yoke is associated with two control rods 137 which, themselves, are double acting hydraulic piston rods moving inside cylinders 138 associated with the stand 136. The stand 136 is provided with a perforation 139 which allows a free passage to the cylinder 130 with a view to save space and, for the same purpose, the rods 137 are attached to the bottom of blind bores 140, which come and cover the cylinder 138 when the yoke 131 is at its withdrawn position.

The rear portion 141 of the yoke 131 is associated with a socket 142 within which is housed a socket 143 perforated with cooling ducts 143a; said duct 143 contains a cylinder 144 cooled by means of said cooling ducts and which serves as a guide for the piston 55 of the injection cylinder 66 when it is compelled to move back at the same time as the yoke 131. The pivot 100 of the ladle 67 rotates on the notched extension of the socket 143 and is stopped axially by a shoulder of the socket 142 and a second shoulder added on the end of the socket 143. The socket 143 itself is keyed on the end of the cylinder 66.

To relieve the pivot 100 and bearing members 100a from the weight of the ladle loaded with liquid metal, this ladle is provided with a stand 145 resting through an anti-friction bearing 146 on the lower rod 135, said stand being thus capable of sliding along the rod 135 when the ladle is moved sidewise.

The operation of the thus built apparatus is as follows:

The rods 137 pull on the yoke 131 which can drive the ladle 67 laterally with respect to the machine and release it from the piston 114. The ladle is easily accessible. It may be cleaned and its refractory lining can be changed. The reverse operation of the pistons contained within the cylinders 138 makes it possible to bring back the ladle in position and, at that time, the end of the cylinder 66 enters a housing for the corresponding end of the cylinder 56 facing it.

It is obvious that, within the scope of the invention, modifications may be made to the types of embodiment just described.

In particular, the operations may be controlled by hand and separately or they may be controlled by automatic relays which will effect the operating cycle for pressure diecasting.

What I claim is:

1. The combination with a pressure diecasting machine having a main frame, a mould comprising a cope slidably mounted on said frame and formed with a pouring hole and a drag movable to get closer to or farther away from the cope, means for displacing the cope and the drag, a multiplicity of injection cylinders within which reciprocate pistons, means for supplying said cylinders with molten metal and means for simultaneously reciprocating said pistons in said cylinders when the latter are filled with molten metal, of a slidable frame supporting the cope and having a central tapered hole the smaller aperture of which communicates with the pouring hole of said cope, a cross-piece carried by the main frame and on which bears the surface of said slidable frame opposite to said cope when the mould is closed, the contacting surfaces of said sliding frame and of said cross-piece being formed with facial radial half-cylindrical recesses having a radius equal to that of the pistons, the half-cylindrical recesses pertaining to said slidable frame communicating with said tapered hole, whereby when the slidable frame bears on the cross-piece the facing half-cylindrical recesses act as injection cylinders within which the pistons are displaced towards said tapered hole up to the edge of its bigger aperture for managing a junction chamber while said injection cylinders may be cleaned when said slidable frame moves farther away from said cross-piece, means for closing said tapered hole during the filling of said injection cylinders with molten metal and after the filling of the mould with said molten metal, means for dieing said metal when said mould is filled therewith, and means for operating said closing and dieing means.

2. An arrangement according to claim 1, wherein the slidable frame is formed with a central cylindrical hole and wherein each of the half-cylindrical recesses comprises two aligned half-cylindrical parts the inner one of which corresponds to the portion of the injection cylinder receiving the molten metal and has a diameter greater than that of the outer one, said arrangement further comprising half-cylindrical fittings inserted in said inner parts of said half-cylindrical recesses and the inner walls of which respectively extend the inner walls of said outer parts, and a socket inserted within said central cylindrical hole and formed with a central tapered hole the smallest aperture of which communicates with the pouring hole of the cope, whereby said fittings and said socket may be easily changed when injured by repeated discasting operations.

3. An arrangement according to claim 1, wherein the means for closing the tapered hole, for dieing the metal and for operating the closing and dieing means comprise a closing sleeve for being applied over the bigger aperture of the tapered hole, said sleeve having an outer diameter equal to the diameter of said bigger aperture, a mandrel slidingly mounted in said sleeve for being applied against the smaller aperture of said tapered hole, means for controlling said sleeve and said mandrel so that successively are operated the closure of said smaller aperture by said mandrel during the filling of the injection cylinders said sleeve being not applied over said bigger aperture, the return of the end of said mandrel to the level of the end of said sleeve at the end of the filling of said cylinders, the displacement of the mandrel-sleeve assembly in the junction chamber for sweeping the metal contained in said chamber after said cylinders are drawn off and closing said bigger aperture at the end of the injection step and the sliding of said mandrel within said sleeve to make it enter—said tapered hole closed by said mandrel with a view to obtain considerable pressure in the metal contained in the mould immediately after the injection step is performed.

4. An arrangement according to claim 3, wherein the controlling means for the mandrel and sleeve comprises a group of telescopic thrust pistons and a group of return cylinders, said telescopic pistons being tied directly to the mandrel, a piece forming bridge tied to said telescopic pistons, operating rods associated with said bridge going through said bridge, a first series of hydraulic wedging locks for locking said bridge on said operating rods during the motion of the mandrel-sleeve assembly in the junction chamber of the injection cylinders, a second series of wedging hydraulic locks for associating said operating rods with a fixed part of the machine when the locks of the first series are unlocked while said mandrel moves with respect to said sleeve, and means for respectively engaging and disengaging each one of said series of locks.

JAIME DE STERNBERG.

REFERENCES CITED

The following references are of record in the file of this patent:

UNITED STATES PATENTS

| Number | Name | Date |
|---|---|---|
| 1,961,942 | Pack | June 5, 1934 |
| 2,183,112 | Vontobel | Dec. 12, 1939 |
| 2,372,177 | Connor | Mar. 27, 1945 |

FOREIGN PATENTS

| Number | Country | Date |
|---|---|---|
| 341,557 | Great Britain | Jan. 22, 1931 |